US000001861H

United States Statutory Invention Registration [19]

[11] Reg. Number: H1,861

Aldrich et al.

[45] Published: Sep. 5, 2000

[54] COMPOSITE PRODUCTION WITH CONTINUOUS METAL AND CERAMIC PHASES

[75] Inventors: Darin J. Aldrich, Thornton, Colo.; Rajan Tandon, Peoria, Ill.

[73] Assignee: Caterpillar Inc., Peoria, Ill.

[21] Appl. No.: 09/176,421

[22] Filed: Oct. 21, 1998

[51] Int. Cl.[7] ..... C04B 35/00; B05D 7/22

[52] U.S. Cl. ..... 501/97.4; 501/98.3; 427/181; 427/182; 427/192; 427/376.1

[58] Field of Search ..... 501/96.3, 97.4; 427/181, 182, 192, 376.1

[56] References Cited

U.S. PATENT DOCUMENTS

| | | | |
|---|---|---|---|
| 5,298,283 | 3/1994 | Rocazella et al. | 427/181 |
| 5,464,655 | 11/1995 | Takahata | 427/238 |
| 5,482,609 | 1/1996 | Kobayashi et al. | 204/412 |
| 5,500,244 | 3/1996 | Rocazella et al. | 427/181 |
| 5,525,374 | 6/1996 | Ritland et al. | 427/376.1 |
| 5,547,556 | 8/1996 | Kobayashi et al. | 204/426 |
| 5,552,180 | 9/1996 | Finley et al. | 427/165 |
| 5,618,590 | 4/1997 | Naruse et al. | 427/528 |
| 5,626,914 | 5/1997 | Ritland et al. | 427/377 |
| 5,696,057 | 12/1997 | McArdle | 505/1 |

*Primary Examiner*—Peter A. Nelson

*Attorney, Agent, or Firm*—Calvin E. Glastetter; O. Gordon Pence

[57] ABSTRACT

The present invention relates to a ceramic alloy composite composition having the alloy spontaneously infiltrated into the ceramic, with the preferred ceramic alloy composite composition being a $Si_3N_4$/TiN/Cu-Ti composite composition and a method for forming the ceramic alloy composite composition.

16 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COMPOSITE PRODUCTION WITH CONTINUOUS METAL AND CERAMIC PHASES

TECHNICAL FIELD

The present invention relates to a method for the production of continuous phase composite compositions having a continuous phase metal and a continuous phase ceramic and the compositions produced from the method. The present invention preferably relates to a silicon nitride ($Si_3N_4$) copper (Cu) titanium (Ti) composite composition ($Si_3N_4$/Cu/Ti), more specifically to a ($Si_3N_4$/TiN/Cu-Ti) composite composition, and a method for forming such composite composition.

BACKGROUND ART

Composite materials comprised of alloy and ceramic materials are known and are ideally suited for use in products requiring high temperature tolerance and wear resistance, which is typically associated with ceramics, and toughness, which is typically associated with metals or alloys. As such, the composite materials provide desirable wear, thermal, and hardness characteristics to products made from such materials. When products are made from only a ceramic or only an alloy the products often lack the necessary combination of characteristics required for certain uses. For instance, steel alloys have been used to form a variety of products, but the use of steel has been undesired because it often does not impart sufficient thermal resistance for use in certain types of products. Ceramics impart high thermal resistance, but are generally not strong enough and do not have a high fracture toughness. For these reasons composites are desirable because they combine the desirable characteristics of both alloys and ceramics.

Engine components, such as valve guides and mechanical seals for example, are subject to high temperature environments and are also subject to harsh conditions which test the strength and wear resistance of the components. For these types of components it is desired to use a composite material comprised of an alloy or metal and a ceramic because of the desired combined characteristics. Specifically, the mentioned engine components require high temperature tolerance and increased hardness and wear resistance characteristics, so that the components require the characteristics associated with the alloys and the ceramics.

The composite compositions, however, have typically not been used to form the above-mentioned types of components and devices because the process for forming products from such composite compositions has generally been too expensive. Hot isostatic pressing is an example of a method that has been previously used to produce ceramic alloy composite compositions. Unfortunately, hot isostatic pressing is currently an expensive process to perform and the composite compositions have to be produced and then machined into a finished product. Machining composite compositions into a finished component or product is generally expensive. For these reasons, it is desired to have a process, other than hot isostatic pressing, for producing composite compositions. It is further desired to have a process for forming composite compositions which is presently not economically prohibitive and which is suited for use in the production of various engine components. Additionally, it is desired to have a process for forming composite compositions which does not require extensive machining of products made from the composite materials, but which instead allows for the production of the component during formation of the composite composition. In other words, it is desired to form a ceramic of the desired component shape and then form the composite composition.

DISCLOSURE OF THE INVENTION

The present invention relates to a method for forming a continuous phase composite composition and the continuous phase composite composition formed from the method. The composite composition will be comprised of an alloy and a ceramic substrate, with the alloy spontaneously infiltrated into the ceramic substrate. Preferably, the continuous phase composite composition will be comprised of an $Si_3N_4$ substrate, a titanium-nitride layer, and a copper titanium alloy layer, so that an $Si_3N_4$/TiN/Cu-Ti composite composition is formed.

The method includes the steps of press forming a ceramic into a ceramic substrate, firing the ceramic substrate to form a fired ceramic substrate, and spontaneously infiltrating the fired ceramic substrate with an alloy. First, a ceramic is chosen to form the ceramic substrate. The ceramic is preferably a ceramic nitride and more preferably is selected from the group consisting of alumina, aluminum nitride, silicon nitride, and combinations thereof. Once selected, the ceramic is form pressed into a ceramic substrate having a density ranging between about 40% and about 50%. It is preferred if the ceramic is form pressed into a shape resembling the finished product.

Next the ceramic substrate is fired to further densify the ceramic. Any of a variety of methods can be used to fire the ceramic so long as the ceramic has a porosity ranging between about 10% and about 50%. The porosity will determine whether the composite composition has characteristics more similar to the alloy or the ceramic.

The fired ceramic substrate is then spontaneously infiltrated with an alloy. Any of a variety of alloys can be used as long as the alloy contains either titanium or chromium in an amount equal to up to 50% by weight of the alloy. A variety of methods can be used to heat the alloy so long as the alloy is spontaneously infiltrated into the ceramic substrate.

After performance of the method a continuous phase composite composition will be formed. Preferably, the present method will result in the formation of a $Si_3N_4$/TiN/Cu-Ti composite composition.

BEST MODE FOR CARRYING OUT THE INVENTION

The present invention relates to a ceramic metal continuous phase composite composition and a method for producing the continuous phase composite composition, with the composite composition comprised of a continuous metal phase and a continuous ceramic phase. Preferably, a $Si_3N_4$/TiN/Cu-Ti composite composition is formed wherein the composite system has a silicon nitride ($Si_3N_4$) substrate, a titanium nitride (TiN) layer, and a copper-titanium (Cu-Ti) alloy layer, with the alloy spontaneously infiltrated into the substrate. The composite composition is well suited for use in the production of high temperature tolerant and impact resistant structural components such as engine components.

The method is initiated by selecting a ceramic for use as a substrate, with any ceramic available for use that has a constituent that will react with an alloy to form a bond between the alloy and the ceramic. More particularly, the ceramic should allow for spontaneous infiltration of the alloy into the ceramic substrate. Generally, any ceramic nitride can be used as the ceramic substrate material. Preferably, the ceramic substrate material is selected from the group consisting of silicon nitride ($Si_3N_4$), aluminum nitride (AlN), alumina ($Al_2O_3$), and combinations thereof. The most preferred ceramic for use as the substrate is $Si_3N_4$. It is also preferred if the substrate material is in powder form so it can be readily shaped into a product.

Once the ceramic has been selected it is form processed so that the ceramic, preferably $Si_3N_4$, is formed into a substrate having a shape resembling the desired finished product. The forming process for the $Si_3N_4$ substrate involves compressing the ceramic to form a pressed ceramic substrate having a density ranging between about 40% and about 50%. Typically, a dry pressing method is used to form the pressed ceramic substrate; however, any method can be used that forms the pressed ceramic material into a substrate having a density ranging between about 40% and about 50%. Among the methods available for form processing the ceramic material into the pressed ceramic substrate are dry-pressing, isostatic pressing, slip casting, gel casting, injection molding, and free-form fabrication.

After formation of the pressed ceramic substrate, the substrate is fired to further densify the ceramic material and form a fired ceramic substrate. The particular time and temperature used to fire the ceramic substrate will be dependent upon the desired density and grain size of the finished ceramic substrate. If the composite composition requires characteristics typically associated with the ceramic, then it is necessary to process the ceramic longer to increase the density and decrease the porosity. If the composite composition requires characteristics more typically associated with an alloy or metal than it is necessary to process the ceramic a lesser amount of time. Porosity, which is directly related to density, in the ceramic can range between about 10% and about 50%, with the lesser porosity the result of higher temperatures and longer processing times. Also, with increased temperature and time the grain size in the ceramic will increase. As the porosity decreases less alloy can infiltrate the substrate and, as such, the composite composition will be characterized more by the ceramic than by the alloy. The firing step will form a solid fired ceramic substrate, with the heating or firing of the ceramic achieved in a number of ways. Among the methods available for firing the ceramic are conventional sintering, microwave sintering, hot isostatic pressing, and plasma arc sintering.

Conventional sintering or heating in a box furnace in air is the most preferred way for firing the pressed ceramic substrate. The ceramic is typically processed by firing the $Si_3N_4$ at a temperature ranging between about 1000° C. and about 1200° C. for a time period ranging between about 30 minutes and about five (5) hours. More preferably, the pressed ceramic substrate is fired for a period of time ranging between about 60 minutes and about 120 minutes.

Following the ceramic, preferably $Si_3N_4$, substrate formation, the substrate is spontaneously infiltrated with an amount of an alloy or metal. Any alloy or metal can be used that contains a constituent that will react with and spontaneously infiltrate the ceramic substrate. The reaction that occurs should provide for wetting of the alloy into the substrate, so as to allow the ceramic to be spontaneously infiltrated. Among the alloys suitable for use in the present invention are copper titanium (Cu-Ti), nickel-titanium (Ni-Ti), iron-titanium (Fe-Ti), alloys of titanium, chromium (Cr) alloys of nickel, titanium (Ti), and copper, and titanium alloys of nickel, iron, and copper, with all of the alloys having up to 50% by weight of Ti or Cr. Preferably, a copper-titanium alloy (Cu-Ti) is infiltrated into the $Si_3N_4$ substrate to form a $Si_3N_4$/TiN/Cu-Ti composite composition. The infiltration of the Cu-Ti alloy into the substrate will occur at a temperature ranging between about 1000° C. and about 1200° C. for a period of time equal to between about 30 minutes and about 120 minutes. It is also preferred if the infiltration occurs in a vacuum or in a reducing atmosphere containing approximately 5% $H_2$ and with the balance being Argon. The atmosphere should be devoid of oxygen to prevent oxidation of the alloy. Any controlled atmosphere furnace can be used to infiltrate the alloy into the ceramic substrate. Any amount of time can be used for infiltrating the alloy into the substrate, so long as the alloy is sufficiently melted; however, preferably, the time for melting the alloy will be equal to about 60 minutes.

The alloy prior to infiltration into the substrate and densification can be in powdered form, melted liquid form, sheet form, or ingot form. Any form can be used as long as the alloy is spontaneously infiltrated into the ceramic substrate and the composite composition is formed. Methods for heating the powder alloy include placing the substrate alloy powder combination in a hot press devoid of oxygen.

The finished composite composition will have an amount of ceramic equal to from about 50% to about 90% by volume of the composite composition and an amount of alloy equal to from about 50% to about 10% by volume of the composite composition. The preferred composite composition will have the formula $Si_3N_4$/TiN/Cu-Ti.

EXAMPLES

A composite composition was formed by first dry pressing 2.0 gms of $Si_3N_4$ powder (Stock #SN-E10, UBQ 050002, Ube Inc., 2-3-11, Higashi-Shinagawa, Shingawa-Ku, Tokyo, Japan) without a binder in a double acting steel die, at a pressure of 5200 psi. The $Si_3N_4$ powder was pressed into a pellet shape. Stearic acid was used as the die lubricant. The dry pressing step formed a pressed $Si_3N_4$ substrate pellet.

The pressed $Si_3N_4$ substrate was then fired in air in a box furnace (Model #26144, Lindberg, A Unit of General Signal, Watertown, Wis. 53094) for 3 hours at 1200° C. The density of the pellet after firing, as measured by Archimdes method, was 47.6% of theoretical, or 1.52 gm/cc. The firing step resulted in the formation of a fired $Si_3N_4$ substrate pellet.

An alloy powder in an amount equal to 2.1 gms and having the composition, 50% by weight Cu (Cu Stock #A16234, Alfa Aesar, Wardhill, Mass.) and 50% by weight of Ti, (Ti stock #10386, Alfa Aesar, Wardhill, Mass.) was placed on the fired $Si_3N_4$ substrate in a vacuum hot-press (Model #VHP-12-12-12-2100 100T, AVS Inc., 60 Fitchburg Rd., Ayer, Mass. 01432) without applying any mechanical load. The base pressure of the run was 10 mTorr. The sample was fired at 1000° C. for 1 hour. At the conclusion of firing a $Si_3N_4$/TiN/Cu-Ti composite composition was formed.

INDUSTRIAL APPLICABILITY

The present invention relates to a method for forming a composite composition preferably of the formula $Si_3N_4$/TiN/Cu-Ti and the composition. Composite compositions are often used to form components and devices used in engines, for example. It is desired to have a composite composition for use in forming components and devices, as the composite compositions ideally impart high temperature tolerance and wear resistance. In particular, the $Si_3N_4$/TiN/Cu-Ti composite composition is well suited for use in applications requiring high temperature tolerance and wear resistance. As such, the $Si_3N_4$/TiN/Cu-Ti composite composition is useful in forming various components and parts, especially engine components.

It is also desired to have a method for making this composite composition that is presently cost effective and easily forms the composite composition. The present method is a cost effective method for forming the composite composition and results in the formation of composite compositions having high temperature tolerance and wear resistance.

What is claimed is:

1. A method for forming a ceramic alloy composite composition wherein the steps of said method are:

a) pressing a ceramic to form a pressed ceramic substrate having a density ranging between about 40% and about 50%;

b) firing said pressed ceramic substrate at a temperature ranging between about 1000° C. and about 1200° C. for a period of time ranging between about 30 minutes and about five hours to form a ceramic substrate; and, c) spontaneously infiltrating said ceramic substrate with an amount of an alloy capable of spontaneously infiltrating said ceramic substrate and containing a constituent that will allow wetting of said alloy on said ceramic substrate, with said spontaneous infiltration step performed at a temperature ranging between about 1000° C. and about 1200 C. for a period of time ranging between about 30 minutes and about 120 minutes, with said method forming said ceramic alloy composite composition.

2. The method of claim 1 wherein said ceramic is selected from the group consisting of ceramic nitrides.

3. The method of claim 2 wherein said ceramic is selected from the group consisting of silicon nitride, aluminum nitride, alumina, and combinations thereof.

4. The method of claim 3 wherein said ceramic is preferably selected from the group consisting of $Si_3N_4$.

5. The method of claim 1 wherein said alloy is selected from the group consisting of titanium alloys and chromium alloys.

6. The method of claim 5 wherein said alloy is selected from the group consisting of copper titanium, nickel titanium, iron titanium, alloys of titanium, chromium alloys of nickel, titanium, and copper, and titanium alloys of nickel, iron, and copper.

7. The method of claim 1 wherein said ceramic substrate has a porosity ranging between about 10% and about 50%.

8. The method of claim 1 wherein said spontaneous infiltration step occurs in an atmosphere substantially devoid of oxygen.

9. A method for forming a $Si_3N_4$/TiN/Cu-Ti composite composition wherein the steps of said method are:

a) pressing an amount of $Si_3N_4$ powder into a pressed $Si_3N_4$ substrate having density equal to between about 40% and about 50%;

b) firing said pressed $Si_3N_4$ substrate at a temperature ranging between about 1000° C. and about 1200° C. for a period of time ranging between about 30 minutes and about five hours to form a fired $Si_3N_4$ substrate having a porosity ranging between about 10% and about 50%; and, c) infiltrating said fired $Si_3N_4$ substrate with a Cu-Ti alloy at a temperature ranging between 1000° C. and 1200° C. for a time period ranging between about 30 minutes and 120 minutes in a non-oxidizing atmosphere to form said $Si_3N_4$/TiN/Cu-Ti composite composition.

10. The method of claim 9 wherein said $Si_3N_4$/TiN/Cu-Ti composite composition is comprised of an amount of $Si_3N_4$ equal to from about 50% to about 90% by volume of said $Si_3N_4$/TiN/Cu-Ti composite composition and an amount of Cu-Ti alloy equal to from about 50% to about 10% by volume of said $Si_3N_4$/TiN/Cu-Ti composite composition.

11. A ceramic alloy composite composition having an amount of alloy equal to from about 50% to about 10% by volume of said composite composition and an amount of ceramic equal to from about 50% to about 90% by volume of said composite composition, with said ceramic having a porosity ranging between about 10% and about 50%.

12. The composite composition of claim 11 wherein said ceramic is selected from the group consisting of ceramic nitrides.

13. The composite composition of claim 12 wherein said ceramic is selected from the group consisting of silicon nitride, aluminum nitride, alumina, and combinations thereof.

14. The composite composition of claim 13 wherein said ceramic is $Si_3N_4$.

15. The composite composition of claim 11 wherein said alloy is selected from the group consisting of titanium alloys and chromium alloys.

16. The composite composition of claim 15 wherein said alloy is selected from the group consisting of copper titanium, nickel titanium, iron titanium, alloys of titanium, chromium alloys of nickel, titanium, and copper, and titanium alloys of nickel, iron, and copper.

* * * * *